US011503023B2

United States Patent
Hojo

(10) Patent No.: US 11,503,023 B2
(45) Date of Patent: Nov. 15, 2022

(54) TECHNIQUE FOR MODIFYING COMBINATION OF PLURALITY OF AUTHENTICATION APPARATUSES FORMING MUTUAL AUTHENTICATION PAIRS

(71) Applicant: CANON KABUSHIKI KAISHA, Tokyo (JP)

(72) Inventor: Yuta Hojo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 17/136,495

(22) Filed: Dec. 29, 2020

(65) Prior Publication Data

US 2021/0218738 A1 Jul. 15, 2021

(30) Foreign Application Priority Data

Jan. 15, 2020 (JP) .............................. JP2020-004672

(51) Int. Cl.
*H04L 29/06* (2006.01)
*H04L 9/40* (2022.01)

(52) U.S. Cl.
CPC ...... *H04L 63/0869* (2013.01); *H04L 63/0823* (2013.01); *H04L 63/123* (2013.01); *H04L 63/18* (2013.01)

(58) Field of Classification Search
CPC ............. H04L 63/0869; H04L 63/0823; H04L 63/123; H04L 63/18
See application file for complete search history.

(56) References Cited

U.S. PATENT DOCUMENTS 6,799,273 B1 * 9/2004 Oishi ............... G11B 20/00528
713/169
7,065,648 B1 * 6/2006 Kamibayashi ... G11B 20/00478
713/172

(Continued)

FOREIGN PATENT DOCUMENTS

JP 2009-194555 A 8/2009

OTHER PUBLICATIONS

Han-Yu Lin et al., An Attribute-Based Mutual Authentication Scheme with Time-Bounded Keys, Nov. 2019, ACM, pp. 75-79. (Year: 2019).*

(Continued)

*Primary Examiner* — Jeffrey C Pwu
*Assistant Examiner* — Fahimeh Mohammadi
(74) *Attorney, Agent, or Firm* — Venable LLP

(57) ABSTRACT

A first authentication apparatus obtains a modification restriction parameter which is stored in a second authentication apparatus and which indicates a number of times a mutual authentication pair modification is possible or a number of times modification has been executed. The first authentication apparatus transmits to the second authentication apparatus authentication information corresponding to the modification restriction parameter. The second authentication apparatus receives the authentication information from the first authentication apparatus. The second authentication apparatus determines whether or not the received authentication information is authentication information for permitting the mutual authentication pair modification. In a case where the received authentication information is authentication information that permits the mutual authentication pair modification, the second authentication apparatus and the first authentication apparatus form a mutual authentication pair.

18 Claims, 12 Drawing Sheets

(56) References Cited

U.S. PATENT DOCUMENTS

| | | | | |
|---|---|---|---|---|
| 7,566,106 | B2* | 7/2009 | Silverbrook | B41J 2/17513 347/14 |
| 8,145,074 | B2* | 3/2012 | Kim | G03G 15/55 399/12 |
| 8,583,915 | B1* | 11/2013 | Huang | H04L 9/3234 726/6 |
| 11,288,248 | B2* | 3/2022 | Reddy | G06F 16/951 |
| 2004/0114175 | A1* | 6/2004 | Cherry | H04L 67/02 358/1.14 |
| 2004/0171681 | A1* | 9/2004 | Orihashi | A61P 27/06 514/509 |
| 2011/0129938 | A1* | 6/2011 | Kobayashi | C07K 14/37 530/371 |
| 2016/0004616 | A1* | 1/2016 | Narita | G06F 12/00 714/6.3 |
| 2020/0314647 | A1* | 10/2020 | Wang | H04L 63/0823 |
| 2021/0060964 | A1* | 3/2021 | Oguchi | B41J 2/1752 |
| 2021/0105277 | A1* | 4/2021 | Epstein | H04L 9/3271 |

OTHER PUBLICATIONS

Dave Otway et al., Efficient and Timely Mutual Authentication, Jan. 1987, ACM, vol. 21, Issue 1, pp. 8-10. (Year: 1987).*

Nan Li et al., Lightweight Mutual Authentication for IoT and Its Applications, Oct.-Dec. 1, 2017, IEEE, vol. 2, Issue: 4, pp. 359-370. (Year: 2017).*

Duncan S. Wong et al., Mutual Authentication and Key Exchange for Low Power Wirless Communications, Aug. 6, 2002, IEEE, pp. 39-43. (Year: 2002).*

* cited by examiner

F I G. 5

| | FIRST AUTHENTICATION APPARATUS (EXAMPLE: VIDEO CONTROLLER) | | SECOND AUTHENTICATION APPARATUS (EXAMPLE: IMAGE FORMING APPARATUS) [IDENTIFICATION INFORMATION = Eng1] | | | |
|---|---|---|---|---|---|---|
| | OWN IDENTIFICATION INFORMATION | COUNTERPART IDENTIFICATION INFORMATION | COUNTERPART IDENTIFICATION INFORMATION | COUNTER | LOCK STATE | PASSWORD |
| CASE A | Cont1 | 0 | 0 | 5 | No | None |
| CASE B | Cont1 | 0 → Eng1 | 0 → Cont1 | 5 | No → Yes | None |
| CASE C | Cont2 | 0 | Cont1 | 5 | Yes | None |
| CASE D | Cont2 | 0 → Eng1 | Cont1 → Cont2 | 5 → 4 | Yes | Pass_5→4 |
| (OMITTED) | | | | | | |
| CASE E | Contx | 0 → Eng1 | Contw → Contx | 1 → 0 | Yes | Pass_1→0 |
| CASE F | Conty | 0 | Contx | 0 | Yes | None |

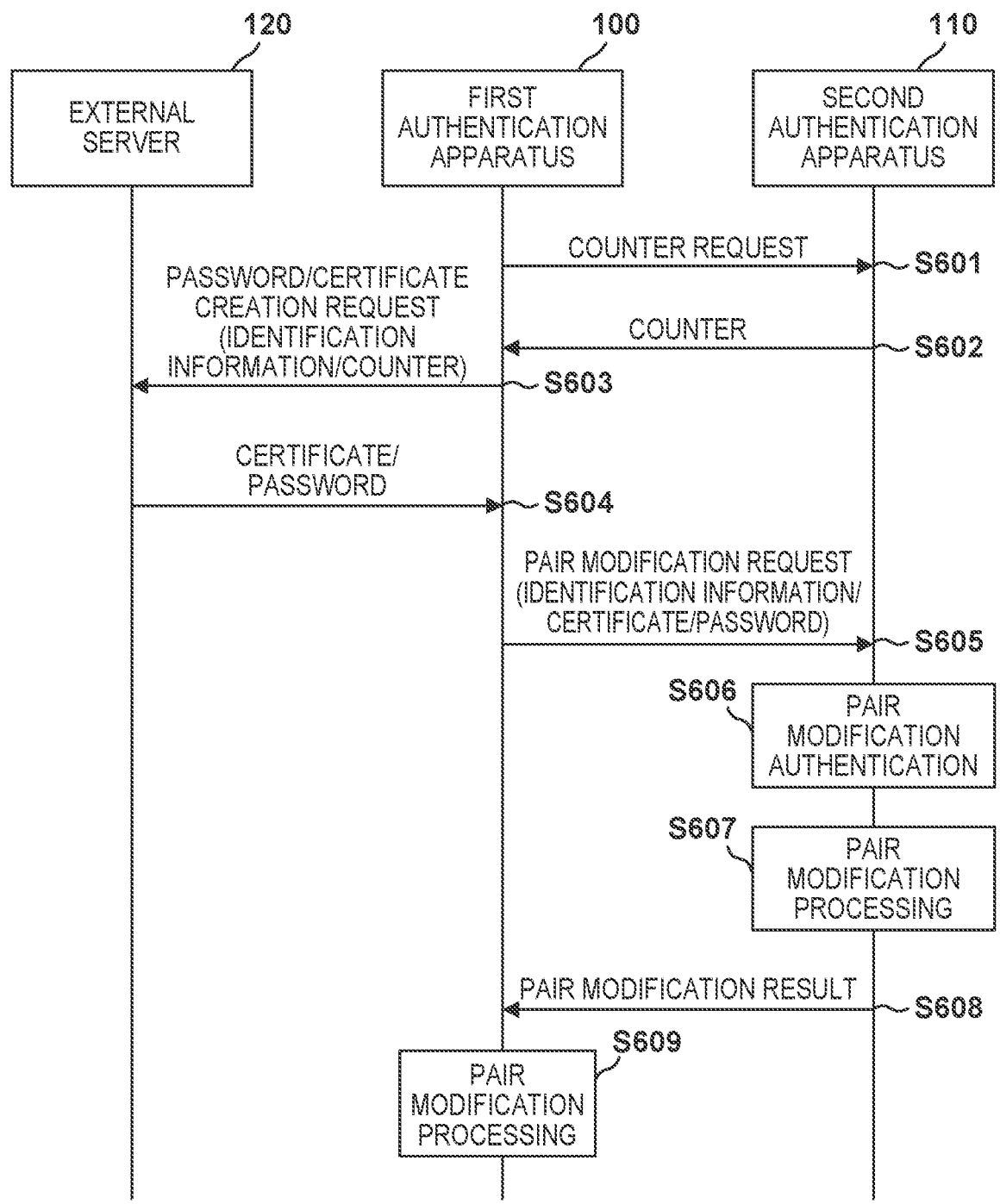

FIG. 8

| | FIRST AUTHENTICATION APPARATUS (EXAMPLE: VIDEO CONTROLLER) | | SECOND AUTHENTICATION APPARATUS (EXAMPLE: IMAGE FORMING APPARATUS) [IDENTIFICATION INFORMATION = Eng1] | | | | FUNCTION SWITCHING METHOD (SWITCHING CERTIFICATE) |
|---|---|---|---|---|---|---|---|
| | OWN IDENTIFICATION INFORMATION | COUNTERPART IDENTIFICATION INFORMATION | COUNTERPART IDENTIFICATION INFORMATION | COUNTER | LOCK STATE | PASSWORD | |
| CASE A | Cont1 | 0 | 0 | 5 | No | None | — |
| CASE B | Cont1 | 0 → Eng1 | 0 → Cont1 | 5 | No → Yes | None | — |
| CASE C | Cont2 | 0 | Cont1 | 5 | Yes | None | — |
| CASE D | Cont2 | 0 → Eng1 | Cont1 → Cont2 | 5 → 4 | Yes | Pass_5→4 | REPLACE |
| (OMITTED) | | | | | | | |
| CASE G | Cont2 | Eng1 | Cont2 | 4 → 3 | Yes | Pass_4→3 | NORMAL MODE |
| CASE H | Cont2 | 0 | 0 | 3 → 2 | Yes or No | — | MUTUAL AUTHENTICATION UNLOCKED |

TECHNIQUE FOR MODIFYING COMBINATION OF PLURALITY OF AUTHENTICATION APPARATUSES FORMING MUTUAL AUTHENTICATION PAIRS

BACKGROUND OF THE INVENTION

Field of the Invention

The present invention relates to a technique for modifying combinations of a plurality of authentication apparatuses forming mutual authentication pairs.

Description of the Related Art

A function of a system with a plurality of apparatuses is achieved by combining the correct plurality of apparatuses assumed in the design. Therefore, when a plurality of unexpected apparatuses are combined, the predetermined function is not achieved. According to Japanese Patent Laid-Open No. 2009-194555, an authentication process using information stored in a storage apparatus has been proposed to determine whether a combination of one apparatus and another apparatus is correct.

However, there is a system that can modify a function by modifying the combination of a specific apparatus and another specific apparatus that make up the system. For example, it may be that a user who has a specific contract is permitted to use a high-level function, and a user who does not have the specific contract is not permitted to use the high-level function. In this case, the function may be limited for each user by changing a combination of a specific apparatus and another specific apparatus for realizing the high-level function, and a combination of the specific apparatus and another specific apparatus for realizing a low-level function. In addition, while the specific apparatus for realizing a high-level function and the specific apparatus for realizing a low-level function may be the same, a high-level function and a low-level function may be differentiated by changing the counterpart apparatus. However, when a user who does not have a specific contract improperly obtains a counterpart apparatus which realizes the high-level function and combines it with their specific apparatus of their own system, the high-level function ends up being realized. Therefore, there is a need for a mechanism by which it is not possible to easily modify a pair that configures a system for realizing a low-level function. However, such a mechanism causes problems when one of the two apparatuses forming the pair fails. That is, in addition to the failed apparatus, the counterpart apparatus that has not failed must also be replaced. Also, if a function is determined by establishing a pair, it becomes difficult to upgrade or downgrade the function.

SUMMARY OF THE INVENTION

The present invention provides a mutual authentication system comprising a first authentication apparatus and a second authentication apparatus and operable to form a mutual authentication pair between the first authentication apparatus and the second authentication apparatus. The first authentication apparatus may comprise a first processor and a first communication circuit connected to the first processor. The first processor is configured to obtain a modification restriction parameter which is stored in the second authentication apparatus and which indicates a number of times a mutual authentication pair modification is possible or a number of times modification has been executed. The first communication circuit is configured to transmit to the second authentication apparatus authentication information corresponding to the modification restriction parameter. The second authentication apparatus may comprise a second processor and a second communication circuit connected to the second processor. The second communication circuit is configured to receive the authentication information from the first authentication apparatus. The second processor is configured to determine whether or not the received authentication information is authentication information for permitting the mutual authentication pair modification. In a case where the received authentication information is authentication information that permits the mutual authentication pair modification, the second authentication apparatus and the first authentication apparatus form a mutual authentication pair.

Further features of the present invention will become apparent from the following description of exemplary embodiments (with reference to the attached drawings).

BRIEF DESCRIPTION OF THE DRAWINGS

FIG. 5 is a view for describing mutual authentication pair formation and modification.

FIG. 6 is a sequence diagram for describing mutual authentication pair formation and modification.

FIG. 8 is a view for describing mutual authentication pair formation and modification.

DESCRIPTION OF THE EMBODIMENTS

Figure 1:
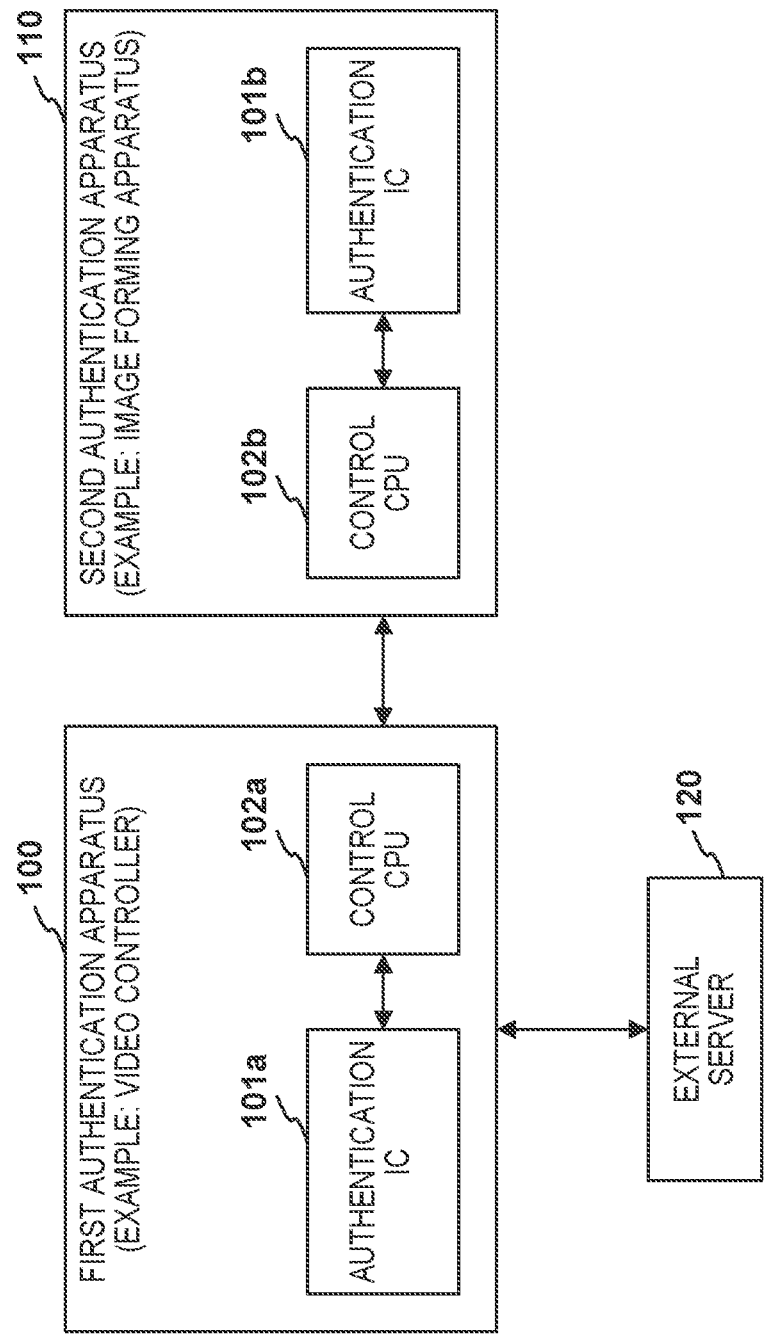
FIG. 1 is a diagram illustrating a mutual authentication system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Mutual Authentication System

FIG. 1 illustrates a first authentication apparatus 100 and a second authentication apparatus 110 forming a mutual authentication pair. The first authentication apparatus 100 and the second authentication apparatus 110, together with an external server 120, form a mutual authentication system.

The first authentication apparatus 100 may be, for example, a video controller that controls an image forming apparatus. The second authentication apparatus 110 may be the main body of the image forming apparatus or an engine controller mounted on the main body. The first authentication apparatus 100 and the second authentication apparatus 110 may be any of a plurality of electronic devices (such as an electronic device and a mechanical device), which combine to realize predetermined functions. More specifically, it may be a combination of an electric device and a consumable, or it may be an electric device and an option apparatus thereof.

The first authentication apparatus 100 has a control CPU 102a and an authentication IC 101a. The control CPU 102a controls the authentication IC 101a. The authentication IC 101a executes the authentication process using the authentication information obtained from the second authentication apparatus 110. The second authentication apparatus 110 has a control CPU 102b and an authentication IC 101b. The control CPU 102b controls the authentication IC 101b. The authentication IC 101b executes the authentication process using the authentication information obtained from the first authentication apparatus 100. In this manner, the first authentication apparatus 100 and the second authentication apparatus 110 perform mutual authentication. The alphabet letters appended to the end of reference numerals may be omitted when common items are described.

The first authentication apparatus 100 is connected to the external server 120. The external server 120 is a server apparatus that provides a certificate (example: digital signature data) when the first authentication apparatus 100 and the second authentication apparatus 110 form a mutual authentication pair, and information for designating a function realized by the mutual authentication pair. The external server 120 includes a CPU (central processing unit), a storage apparatus, and a communication circuit. The CPU causes the external server 120 to create a password and a certificate by executing a program stored in the storage apparatus.

Authentication IC

Figure 2:
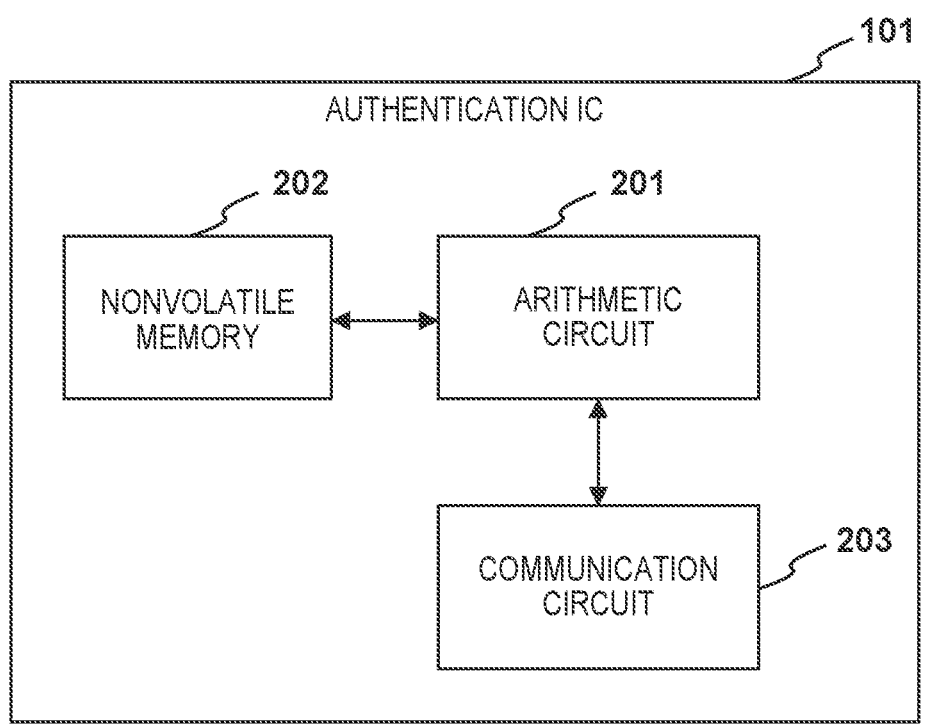
FIG. 2 is a diagram for explaining an authentication IC.

As illustrated in FIG. 2, an authentication IC 101 includes an arithmetic circuit 201, a nonvolatile memory 202, and a communication circuit 203. IC is an abbreviation for integrated circuit. The arithmetic circuit 201 is a processing circuit (processor) such as a CPU, an ASIC, and an FPGA. ASIC is an abbreviation for application specific integrated circuit. FPGA is an abbreviation for field programmable gate array. The nonvolatile memory 202 is a storage apparatus for storing an authentication program, various authentication information, and the like. The communication circuit 203 includes a transmission/reception circuit for communicating with another authentication apparatus as a mutual authentication counterpart, a transmission/reception circuit for communicating with the external server 120, and the like. The nonvolatile memory 202 may include a physical memory for storing secret data and a physical memory for storing public data.

Arithmetic Circuit (Authentication Calculation Unit)

Figure 3:
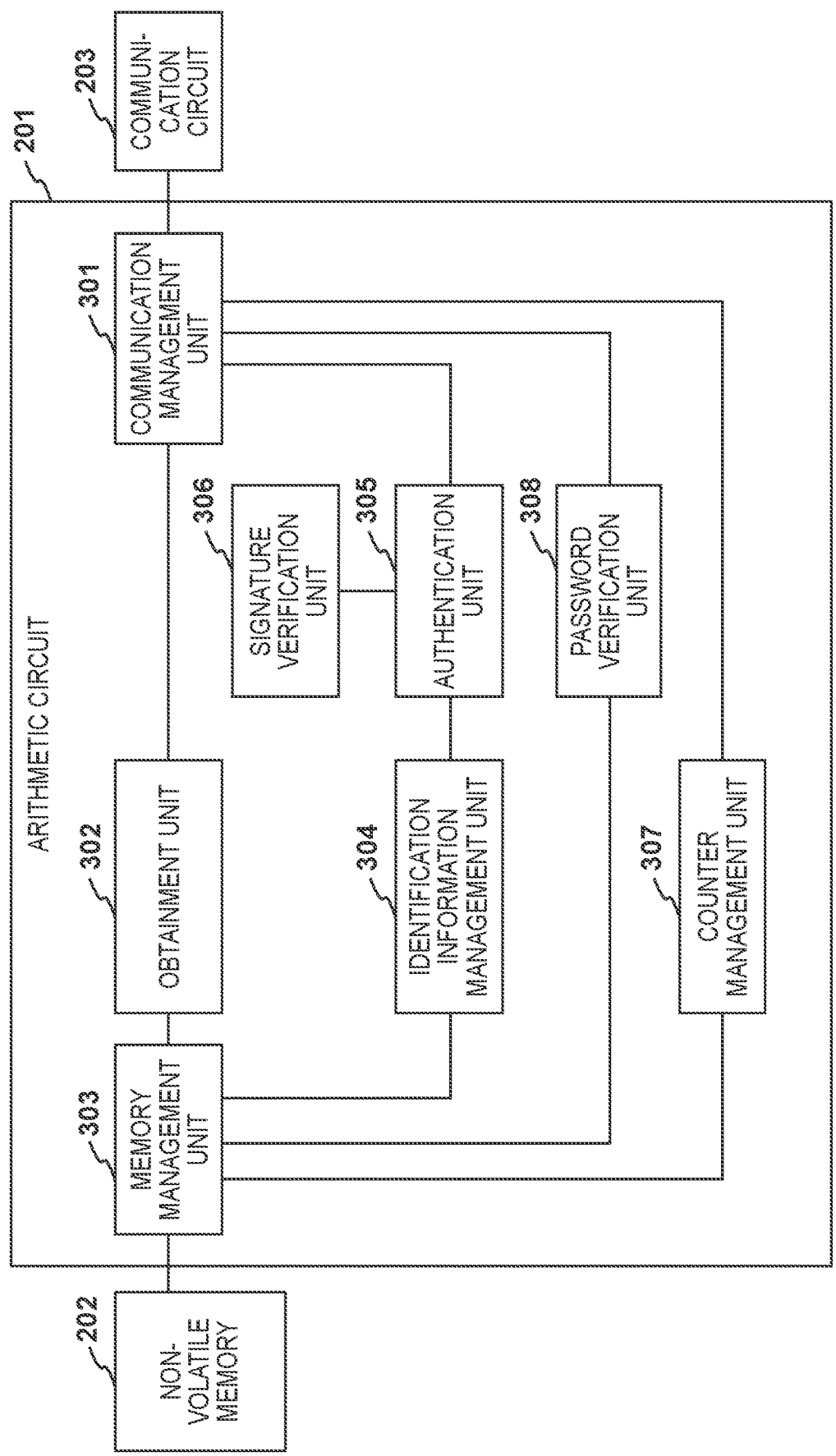
FIG. 3 is a block diagram of an arithmetic circuit.

As illustrated in FIG. 3, the arithmetic circuit 201 has various functions. The arithmetic circuit 201 of the authentication IC 101a may include a communication management unit 301, an obtainment unit 302, a memory management unit 303, an identification information management unit 304, an authentication unit 305, a signature verification unit 306, a counter management unit 307, and a password verification unit 308. The communication management unit 301 controls the communication circuit 203 to cause the communication circuit 203 to receive information from another authentication apparatus and transmit information to another authentication apparatus. Also, the communication management unit 301 controls the communication circuit 203 to cause the communication circuit 203 to receive information from the external server 120 and transmit information to the external server 120. The obtainment unit 302 obtains identification information of the authentication apparatus itself stored in the nonvolatile memory 202 through the memory management unit 303. The memory management unit 303 is a memory controller that controls writing of information to the nonvolatile memory 202 and reading of information from the nonvolatile memory 202. The identification information management unit 304 writes the identification information of another authentication apparatus, as a mutual authentication pair counterpart, in the nonvolatile memory 202, and reads the identification information of the other authentication apparatus, as the mutual authentication pair counterpart, from the nonvolatile memory 202. The authentication unit 305 receives the identification information and the authentication information from the other authentication apparatus that is the mutual authentication pair counterpart, executes an authentication process, reads the identification information and the authentication information of the authentication apparatus itself from the nonvolatile memory 202, and transmits it to the other authentication apparatus. The signature verification unit 306 executes verification processing for determining whether or not a certificate transmitted from the external server 120 is a correct certificate. The counter management unit 307 manages a counter for counting the number of mutual authentication pair modifications. The counter may be stored in the nonvolatile memory 202 as a variable. The password verification unit 308 compares a password received from the external server 120 through the counterpart authentication apparatus with a password stored in the nonvolatile memory 202 and executes password authentication.

Mutual Authentication Process

Figure 4:
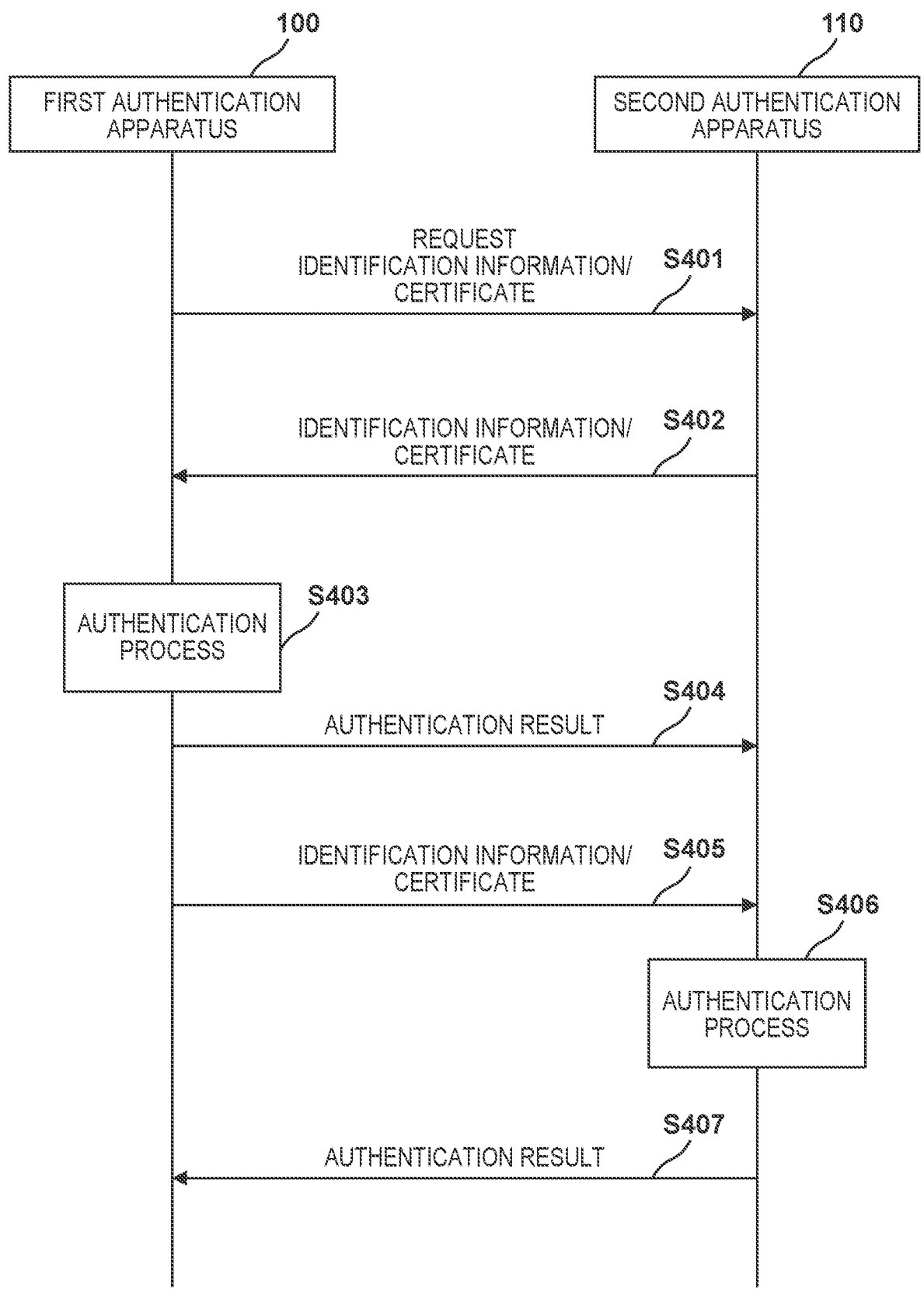
FIG. 4 is a sequence diagram for illustrating a mutual authentication process.

FIG. 4 illustrates mutual authentication processing performed by the first authentication apparatus 100 and the second authentication apparatus 110 which already form a mutual authentication pair. Here, it is assumed that the first authentication apparatus 100 is started by a power source apparatus supplying power to the first authentication apparatus 100, and the first authentication apparatus 100 detecting the second authentication apparatus 110.

In step S401, the authentication unit 305 of the first authentication apparatus 100 requests identification information and an identification information certificate (ID certificate) of the second authentication apparatus 110 from the authentication IC 101b of the second authentication apparatus 110. When a request is received, the authentication unit 305 of the second authentication apparatus 110 reads the identification information and the certificate of the second authentication apparatus 110 stored in the nonvolatile memory 202 through the obtainment unit 302.

In step S402, the authentication unit 305 of the second authentication apparatus 110 instructs the communication management unit 301 to transmit the identification information and the certificate of the second authentication apparatus 110 to the first authentication apparatus 100. The communication management unit 301 controls the communication circuit 203 so as to cause the communication circuit 203 to transmit the identification information and the certificate of the second authentication apparatus 110 to the first authentication apparatus 100. The communication management unit 301 of the first authentication apparatus 100 controls the communication circuit 203 to receive the identification information and the certificate of the second authentication apparatus 110. The communication management unit 301 passes the identification information and the certificate of the second authentication apparatus 110 to the authentication unit 305.

In step S403, the authentication unit 305 of the first authentication apparatus 100 executes a process for authenticating the second authentication apparatus 110. For example, the authentication unit 305 may pass the identification information and the certificate to the signature verification unit 306, and cause the signature verification unit 306 to execute a verification process. The signature verification unit 306 unlocks the certificate and confirms that the returned identification information is correct. For example, the signature verification unit 306 may use a secret one-way function that converts the certificate into identification information. The signature verification unit 306 may verify the validity of the identification information by comparing the received identification information with the identification information obtained from the certificate, and output the verification result to the authentication unit 305. Alternatively, the signature verification unit 306 may perform a predetermined operation on the certificate to obtain an operation result, and verify whether or not the operation result is a predetermined result. In this manner, it may be that the identification information is not used in the certificate verification processing.

When the verification of the identification information by the signature verification unit 306 succeeds, the authentication unit 305 instructs the identification information management unit 304 to obtain the identification information of the authentication apparatus of the counterpart forming the mutual authentication pair. The identification information management unit 304 obtains the identification information of the authentication apparatus of the counterpart stored in advance in the nonvolatile memory 202 through the memory management unit 303 and passes it to the authentication unit 305. The authentication unit 305 performs authentication processing by comparing the identification information of the authentication apparatus of the counterpart stored in the nonvolatile memory 202 with the identification information obtained from the second authentication apparatus 110.

In step S404, the authentication unit 305 of the first authentication apparatus 100 instructs the communication management unit 301 to transmit the authentication result to the second authentication apparatus 110. The communication management unit 301 controls the communication circuit 203 so as to cause the communication circuit 203 to transmit the authentication result to the second authentication apparatus 110. If the authentication process is successful, the first authentication apparatus 100 further performs the following steps.

In step S405, the authentication unit 305 of the first authentication apparatus 100 instructs the obtainment unit 302 to obtain the identification information and the certificate of the first authentication apparatus 100 from the nonvolatile memory 202. The obtainment unit 302 controls the memory management unit 303 and reads the identification information and the certificate of the first authentication apparatus 100 from the nonvolatile memory 202. The obtainment unit 302 passes the identification information and the certificate of the first authentication apparatus 100 to the authentication unit 305. The authentication unit 305 instructs the communication management unit 301 to transmit the identification information and the certificate of the first authentication apparatus 100 to the second authentication apparatus 110. The communication management unit 301 controls the communication circuit 203 to transmit the identification information and the certificate of the first authentication apparatus 100 to the second authentication apparatus 110. The communication management unit 301 of the first authentication apparatus 100 receives the identification information and the certificate of the second authentication apparatus 110 through the communication circuit 203. The communication management unit 301 of the second authentication apparatus 110 passes the identification information and the certificate of the first authentication apparatus 100 to the authentication unit 305 of the second authentication apparatus 110.

In step S406, the authentication unit 305 of the second authentication apparatus 110 executes the authentication process of the first authentication apparatus 100. For example, the authentication unit 305 may pass the identification information and the certificate to the signature verification unit 306, and cause the signature verification unit 306 to execute a verification process. The signature verification unit 306 unlocks the certificate and confirms that the returned identification information is correct. For example, the signature verification unit 306 may use a secret one-way function that converts the certificate into identification information. The signature verification unit 306 may verify the validity of the identification information by comparing the received identification information with the identification information obtained from the certificate, and output the verification result to the authentication unit 305. Alternatively, the signature verification unit 306 may perform a predetermined operation on the certificate to obtain an operation result, and verify whether or not the operation result is a predetermined result. In this manner, it may be that the identification information is not used in the certificate verification processing.

When the verification of the identification information by the signature verification unit 306 succeeds, the authentication unit 305 instructs the identification information management unit 304 to obtain the identification information of the authentication apparatus of the counterpart forming the mutual authentication pair. The identification information management unit 304 obtains the identification information of the authentication apparatus of the counterpart stored in advance in the nonvolatile memory 202 through the memory management unit 303 and passes it to the authentication unit 305. The authentication unit 305 performs authentication processing by comparing the identification information of the authentication apparatus of the counterpart stored in the nonvolatile memory 202 with the identification information obtained from the first authentication apparatus 100.

In step S407, the authentication unit 305 of the second authentication apparatus 110 instructs the communication management unit 301 to transmit the authentication result to the first authentication apparatus 100. The communication management unit 301 controls the communication circuit 203 so as to cause the communication circuit 203 to transmit the authentication result to the first authentication apparatus 100. If the authentication result indicates success, the authentication unit 305 of the first authentication apparatus 100 determines that mutual authentication is successful.

Mutual Authentication Pair Formation (Modification)

FIG. 5 illustrates authentication information stored in the nonvolatile memory 202 of the first authentication apparatus 100 and authentication information stored in the nonvolatile memory 202 of the second authentication apparatus 110. Here, six different cases A to F are illustrated. The nonvolatile memory 202 of the first authentication apparatus 100 stores the identification information of itself (the first authentication apparatus 100) and the identification information of the counterpart forming the mutual authentication pair. The nonvolatile memory 202 of the second authentication apparatus 110 stores the identification information of itself (a second authentication apparatus 100) and the identification information of the counterpart forming the mutual authentication pair, a counter, a lock state, and a password. The counter indicates the number of times the second authentication apparatus 110 has performed the formation (modification) of a mutual authentication pair and the number of times it can be executed. In FIG. 5, the counter indicates the number of times it can be performed. The lock state indicates whether or not the formation of the mutual authentication pair has been completed. Once the second authentication apparatus 110 has completed the formation of the mutual authentication pair, the lock state is modified from No (unlocked) to Yes (locked). The password corresponds to the counter count value. When the number of possible mutual authentication pair modifications becomes 0, the password may be set so that the modification of the mutual authentication pair is denied.

In case A, the first authentication apparatus 100 and the second authentication apparatus 110 have not yet formed a mutual authentication pair. In addition, the first authentication apparatus 100 has never formed a mutual authentication pair with another authentication apparatus. The second authentication apparatus 110 has not formed a mutual authentication pair with another authentication apparatus. Therefore, the identification information of the first authentication apparatus 100 counterpart is "0", and the identification information of the second authentication apparatus 110 counterpart is also "0". The counter of the second authentication apparatus 110 is set to "5". This indicates that the second authentication apparatus 110 can form a mutual authentication pair five times. In this example, each time the second authentication apparatus 110 modifies the mutual authentication pair, the count value of the counter is reduced by one. In this example, when the first authentication apparatus 100 and the second authentication apparatus 110 form mutual authentication pairs for the first time respectively, the count value of the counter is not reduced. The lock state of the second authentication apparatus 110 is No. The password has not been set yet.

In case B, the first authentication apparatus 100 and the second authentication apparatus 110 respectively have formed a mutual authentication pair for the first time. The identification information of the counterpart of the first authentication apparatus 100 stores "Eng1" which is the identification information of the second authentication apparatus 110. The identification information of the counterpart of the second authentication apparatus 110 stores "Cont1" which is the identification information of the first authentication apparatus 100. Further, the lock state of the second authentication apparatus 110 is modified from No to Yes.

Case C is a state in which, for a second authentication apparatus 110 which has formed a mutual authentication pair with a first authentication apparatus 100 having the identification information "Cont1", a first authentication apparatus 100 having the identification information "Cont2" is connected to the second authentication apparatus 110. No mutual authentication pair modifications have been executed yet at this stage. In case C, the mutual authentication described above fails because the first authentication apparatus 100 whose identification information is "Cont2" and the second authentication apparatus 110 whose identification information is "Eng1" have not formed a mutual authentication pair.

Case D indicates a state in which a first authentication apparatus 100 whose identification information is "Cont2" and a second authentication apparatus 110 whose identification information is "Eng1" formed a new mutual authentication pair. A mutual authentication pair modification is performed for the second authentication apparatus 110. The identification information of the counterpart for the second authentication apparatus 110 is modified from "Cont1" to "Cont2". The count value of the counter is reduced from "5" to "4". The password switches to the password corresponding to the count value "4".

Case E indicates a state in which a first authentication apparatus 100 whose identification information is "Contx" and a second authentication apparatus 110 whose identification information is "Eng1" formed a new mutual authentication pair. The second authentication apparatus 110 has already performed mutual authentication pair modification four times, and the count value becomes 0 due to the mutual authentication pair modification this time. The password switches to the password corresponding to the count value "0".

Case F indicates a state in which a first authentication apparatus 100 whose identification information is "Conty" was connected to the second authentication apparatus 110 whose identification information is "Eng1". Since the count value of the counter of the second authentication apparatus 110 is already "0", the second authentication apparatus 110 cannot form a mutual authentication pair with the first authentication apparatus 100 whose identification information is "Conty".

FIG. 6 illustrates a process of forming (modifying) a mutual authentication pair. Here, case D is assumed.

In step S601, the authentication unit 305 of the first authentication apparatus 100 transmits a counter request to the second authentication apparatus 110. The request of the counter is transmitted to the second authentication apparatus 110 via the communication management unit 301 and the communication circuit 203 of the first authentication apparatus 100. The authentication unit 305 of the second authentication apparatus 110 receives the request of the counter via the communication management unit 301 and the communication circuit 203 of the second authentication apparatus 110.

In step S602, the authentication unit 305 of the second authentication apparatus 110 reads the counter from the nonvolatile memory 202 via the memory management unit 303, and transmits the counter to the first authentication apparatus 100 via the communication management unit 301 and the communication circuit 203. The authentication unit 305 of the first authentication apparatus 100 receives the counter via the communication management unit 301 and the communication circuit 203 of the first authentication apparatus 100.

In step S603, the authentication unit 305 of the first authentication apparatus 100 obtains the identification information "Cont2" of the first authentication apparatus 100 from the nonvolatile memory 202 and transmits a creation request including the count value of the counter and the identification information "Cont2" to the external server 120. The identification information "Cont2" of the first authentication apparatus 100 is read from the nonvolatile memory 202 through the memory management unit 303 of the first authentication apparatus 100. The identification information "Cont2" of the first authentication apparatus 100 and the count value of the counter are transmitted to the external server 120 via the communication management unit 301 and the communication circuit 203 of the first authentication apparatus 100. The creation request is a request to create a password and a certificate. When the creation request is received, the external server 120 creates a password corresponding to the count value. Further, the external server 120 creates a certificate corresponding to the identification information "Cont2" of the first authentication apparatus 100.

In step S604, the external server 120 transmits a password corresponding to the count value and a certificate corresponding to the identification information "Cont2" of the first authentication apparatus 100 to the first authentication apparatus 100. The authentication unit 305 of the first authentication apparatus 100 receives the password corresponding to the count value and the certificate corresponding to the identification information "Cont2" of the first authentication apparatus 100 from the external server 120. The communication circuit 203 and the communication management unit 301 of the first authentication apparatus 100 are also involved in this reception.

In step S605, the authentication unit 305 of the first authentication apparatus 100 transmits a pair modification request including the identification information "Cont2" of the first authentication apparatus 100, the password and the certificate received from the external server 120 to the second authentication apparatus 110. The communication circuit 203 and the communication management unit 301 of the first authentication apparatus 100 are involved in this transmission. The authentication unit 305 of the second authentication apparatus 110 receives the pair modification request from the first authentication apparatus 100. The communication circuit 203 and the communication management unit 301 of the second authentication apparatus 110 are also involved in this reception.

In step S606, the authentication unit 305 of the second authentication apparatus 110 executes the pair modification authentication based on the pair modification request. For example, the authentication unit 305 unlocks the certificate included in the pair modification request by the signature verification unit 306 and verifies that the identification information included in the pair modification request is valid identification information. The signature verification unit 306 returns the verification result to the authentication unit 305. Here, it is assumed that the verification result indicates that the identification information is valid.

The authentication unit 305 of the second authentication apparatus 110 verifies the password by the password verification unit 308. The nonvolatile memory 202 of the second authentication apparatus 110 stores a password as secret data for each count value of the counter. The authentication unit 305 reads, from the nonvolatile memory 202, the password corresponding to the count value of the counter included in the pair modification request, and checks it against the password included in the pair modification request. When the password verification is successful, the authentication unit 305 of the second authentication apparatus 110 executes step S607.

In step S607, the authentication unit 305 of the second authentication apparatus 110 executes pair modification processing. The authentication unit 305 subtracts 1 (decrements) from the count value of the counter. As illustrated in FIG. 5, in case D, the count value is modified from "5" to "4". Further, the authentication unit 305 writes the identification information "Cont2" obtained from the pair modification request to the identification information of the counterpart stored in the nonvolatile memory 202. As a result, the identification information of the counterpart is modified from "Cont1" to "Cont2".

In step S608, the authentication unit 305 of the second authentication apparatus 110 transmits the pair modification result to the first authentication apparatus 100. The result of the pair modification is either success or failure. If the identification information is not valid, it is a pair modification result. If password matching fails, the pair modification result is failure. The authentication unit 305 of the second authentication apparatus 110 receives the pair modification result from the first authentication apparatus 100. The pair modification result may include identification information of the second authentication apparatus 110.

In step S609, the authentication unit 305 of the first authentication apparatus 100 executes pair modification processing. For example, the authentication unit 305 writes the identification information of the second authentication apparatus 110 to the counterpart identification information in the nonvolatile memory 202. As illustrated in case D of FIG. 5, the identification information of the counterpart is modified from "0" to "Eng1".

In FIGS. 5 and 6, the first authentication apparatus 100 is replaced with another authentication apparatus, but the second authentication apparatus 110 may be replaced. In this case, for example, for another second authentication apparatus 110 whose identification information is "Eng2", only the mutual authentication pair modification processing is performed.

According to the first embodiment, a password corresponding to the number of times mutual authentication pair modification is possible is created by the external server 120. If the number of times modification is possible is already "0", the mutual authentication pair modification is rejected. This prevents unauthorized modifications to the combination of the plurality of authentication apparatuses that realize a specific function, and allows the combinations of the plurality of authentication apparatuses to be switched safely.

The first authentication apparatus 100 may be mounted on a video controller of the image forming apparatus. In this case, the second authentication apparatus 110 is mounted on the image forming apparatus. The second authentication apparatus 110 may be mounted on an option apparatus of the image forming apparatus, and the first authentication apparatus may be mounted on the image forming apparatus. The option apparatus may be a consumable, a feeding apparatus, or a post-processing apparatus. The consumable may be, for example, a cartridge detachable from the image forming apparatus. The cartridge may be, for example, a process cartridge that integrates a photosensitive drum, a developer that supplies toner to the photosensitive drum, and a charger that charges the surface of the photosensitive drum. Other consumables may be a fixing device that fixes the toner image transferred to the sheet to the sheet.

The number of times modification is possible was given as "5", but this is only an example. In the first embodiment, a countdown counter for counting the number of times modification is possible is employed as the counter, but a countup counter for counting the number of times there were modifications may be employed. In the latter case, a further mutual authentication pair modification is rejected when the count value (number of modifications) of the countup counter reaches an upper limit (threshold).

Second Embodiment

In the second embodiment, using certificates to switch functions implemented by mutual authentication pairs is described. In the second embodiment, descriptions of the same or similar items as those in the first embodiment are omitted.

Figure 7:
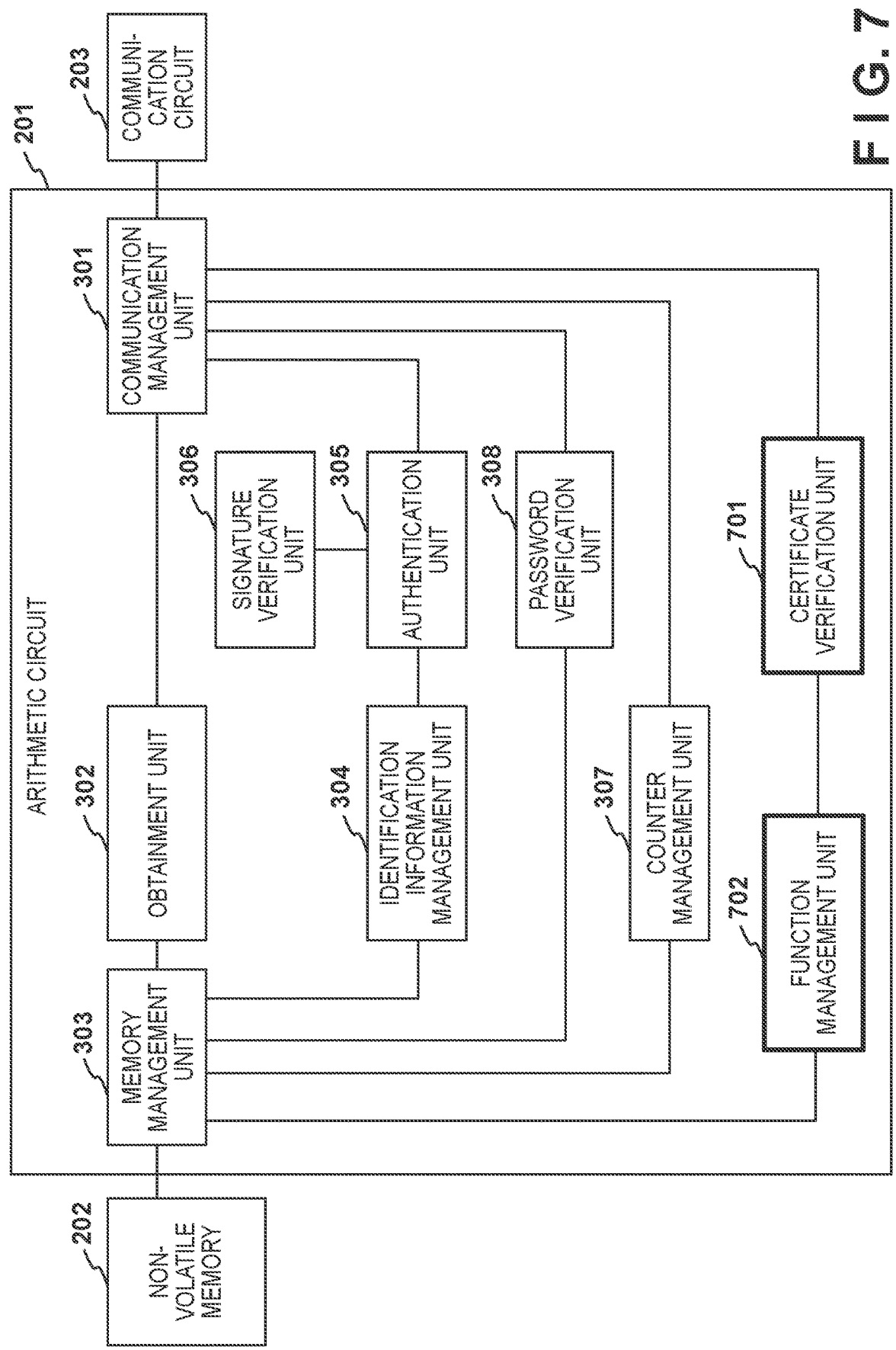
FIG. 7 is a block diagram of an arithmetic circuit.

As illustrated in FIG. 7, the arithmetic circuit 201 further includes a certificate verification unit 701 and a function management unit 702. The certificate verification unit 701 verifies the switching certificate transmitted from the external server 120. The certificates described in the first embodiment are referred to here as an ID certificate. The function management unit 702 manages functions (example: an operation mode) that can be realized by the mutual authentication pair. The external server 120 may transmit a function switching instruction and a corresponding switching certificate. In this case, when the verification of the switching certificate succeeds, the second authentication apparatus 110 switches the function in accordance with the switching instruction. When the verification of the switching certificate fails, the second authentication apparatus 110 rejects the switching instruction.

FIG. 8 illustrates authentication information stored in the nonvolatile memory 202 of the first authentication apparatus 100 and authentication information stored in the nonvolatile memory 202 of the second authentication apparatus 110. Here, new cases G and H are added. In cases D, G, and H, the switching certificate is stored in the nonvolatile memory 202. Switching certificates are certificates that specify the function implemented by the mutual authentication pair. Here, attention is paid to the switching certificates of FIG. 8. "Replace" means replacing of the first authentication apparatus and indicates that the function implemented by the mutual authentication pair is not to be modified. Normal mode indicates that the operating mode implemented by the mutual authentication pair is designated as normal mode. Here, it is assumed that a special mode different from the normal mode exists as the operation mode. "Mutual authentication unlocked" indicates that free operation is possible without performing mutual authentication processing.

Figure 9:
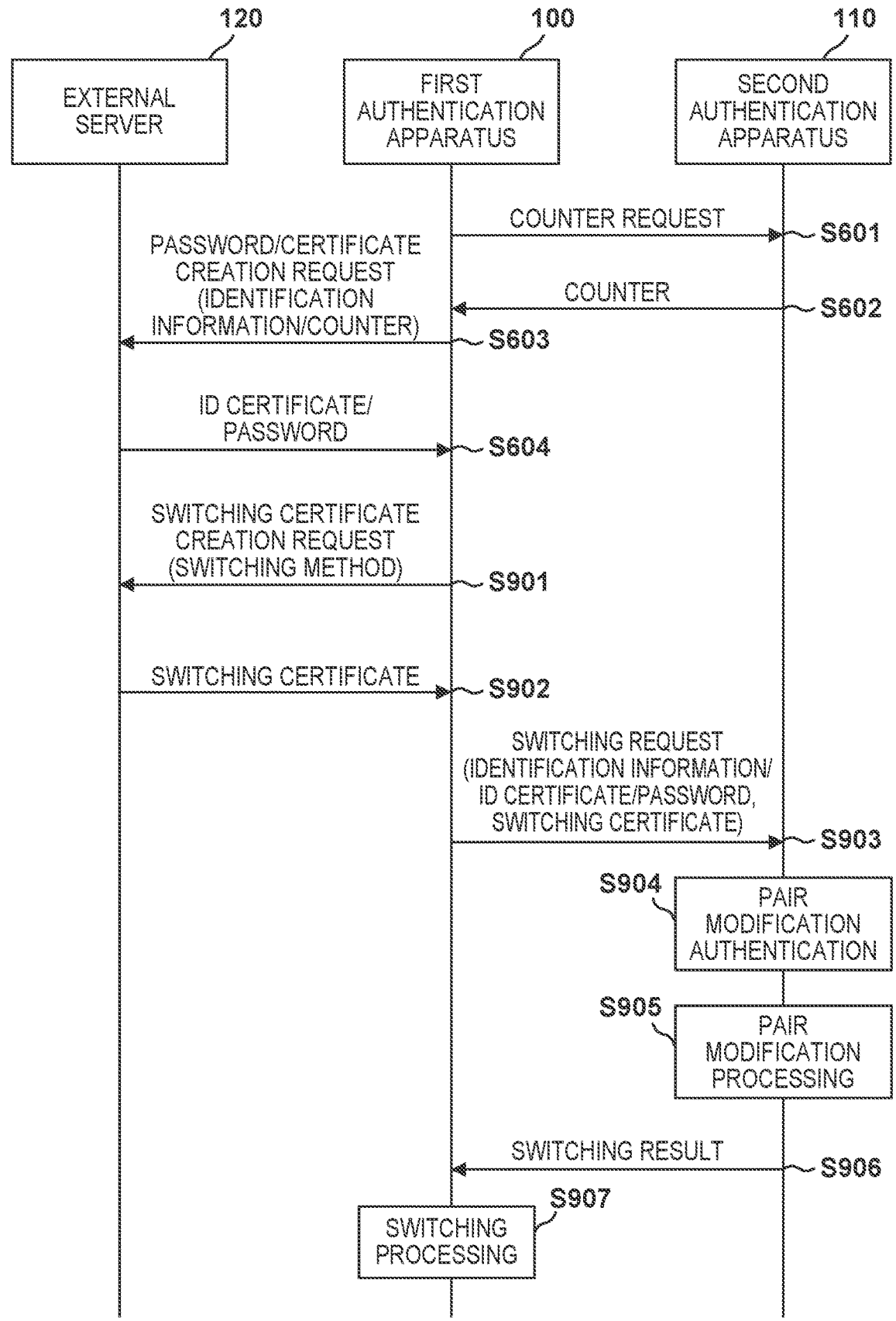
FIG. 9 is a sequence diagram for describing mutual authentication pair formation and modification.

Step S601 or step S604 illustrated in FIG. 9 are the steps already described. Here, case D illustrated in FIG. 8 is assumed.

In step S901, the authentication unit 305 of the first authentication apparatus 100 transmits a request for a switching certificate corresponding to the identification information of the second authentication apparatus 110 to the external server 120. The request may include identification information of the second authentication apparatus 110 or identification information of the first authentication apparatus 100. Furthermore, the request may include identification information of the second authentication apparatus 110 and identification information of the first authentication apparatus 100.

In step S902, the external server 120 creates a switching certificate corresponding to the identification information of the second authentication apparatus 110 and transmits it to the first authentication apparatus 100. The external server 120 can modify the switching certificate in accordance with the identification information of the second authentication apparatus 110. When the request includes the identification information of the first authentication apparatus 100, a switching certificate corresponding to the identification information of the first authentication apparatus 100 is created. When the request includes the identification information of the second authentication apparatus 110 and the identification information of the first authentication apparatus 100, a switching certificate corresponding to the identification information of the second authentication apparatus 110 and the identification information of the first authentication apparatus 100 is created. The authentication unit 305 of the first authentication apparatus 100 receives the switching certificate from the external server 120. The transmission of the request for the switching certificate and the reception of the switching certificate involve the communication management unit 301 and the communication circuit 203.

In step S903, the authentication unit 305 of the first authentication apparatus 100 transmits the switching request to the second authentication apparatus 110. The switching request includes the first authentication apparatus 100 identification information "Cont2", an ID certificate, a password, and a switching certificate. The ID certificate and the password are those obtained in step S604. The authentication unit 305 of the second authentication apparatus 110 receives the switching request from the first authentication apparatus 100.

In step S904, the authentication unit 305 of the second authentication apparatus 110 executes the switching authentication (pair modification authentication) based on the switching request. For example, the authentication unit 305 passes the ID certificate extracted from the switching request to the signature verification unit 306. The signature verification unit 306 unlocks the ID certificate, verifies the identification information of the first authentication apparatus 100, and passes the verification result to the authentication unit 305. When the verification of the identification information is successful, the authentication unit 305 passes the password to the password verification unit 308. The password verification unit 308 verifies the password and returns the verification result to the authentication unit 305. As described above, the password corresponding to the current count value stored in the nonvolatile memory 202 is compared with the password received from the first authentication apparatus 100. The verification result of the password is passed to the authentication unit 305. When the password verification is successful, the authentication unit 305 passes the switching certificate to the certificate verification unit 701. The certificate verification unit 701 verifies the switching certificate and passes the verification result to the function management unit 702. The function management unit 702 determines a function switching method based on the verification result.

In case D illustrated in FIG. 8, the switching method is "replace". Here, "replace" indicates, for example, that the first authentication apparatus 100 that was consumed is to be replaced with a new first authentication apparatus 100. Therefore, the function implemented by mutual authentication pair is not modified. After verification of the ID certificate, the verification of the password, and the verification of the switching certificate are successful, the pair modification processing is performed in step S905.

The authentication unit 305 or the function management unit 702 updates (decrements) the counter of the second authentication apparatus 110 in step S905, and modifies the identification information of the counterpart from "Cont1" to "Cont2". In step S906, the authentication unit 305 or the function management unit 702 transmits the pair modification result to the first authentication apparatus 100.

In step S907, the first authentication apparatus 100 writes "Eng1" which is the identification information of the second authentication apparatus 110 into the identification information of the counterpart of the nonvolatile memory 202.

In case G illustrated in FIG. 8, the switching method is set to normal mode. For example, the user contract permits the mutual authentication pair of the image forming apparatus "Eng1" and "Cont1" to operate in a special mode. Meanwhile, the user contract permits the mutual authentication pair of the image forming apparatus "Eng1" and "Cont2" to operate in a normal mode. The function management unit 702 sets the operation mode of the second authentication apparatus 110 to the normal mode specified by the switching certificate.

In case H illustrated in FIG. 8, the switching method is "mutual authentication unlocked". Mutual authentication unlocked is a state in which the first authentication apparatus 100 and the second authentication apparatus 110 can freely operate without executing mutual authentication. The lock state may also be set to either Yes or No by the switching certificate. Yes means that the ID certificate and password are required when modifying the mutual authentication pair. No means that the mutual authentication pair can be modified without requiring an ID certificate and password.

In FIGS. 8 and 9, the first authentication apparatus 100 is replaced with another authentication apparatus, but the second authentication apparatus 110 may be replaced with another authentication apparatus. In this case, for example, for another second authentication apparatus 110 whose identification information is "Eng2", only the mutual authentication pair modification processing is performed.

Example 2 has a similar effect as Example 1. Further, in the second embodiment, it is possible to switch the function realized by the mutual authentication pair safely by the switching certificate.

Third Embodiment

Figure 10:
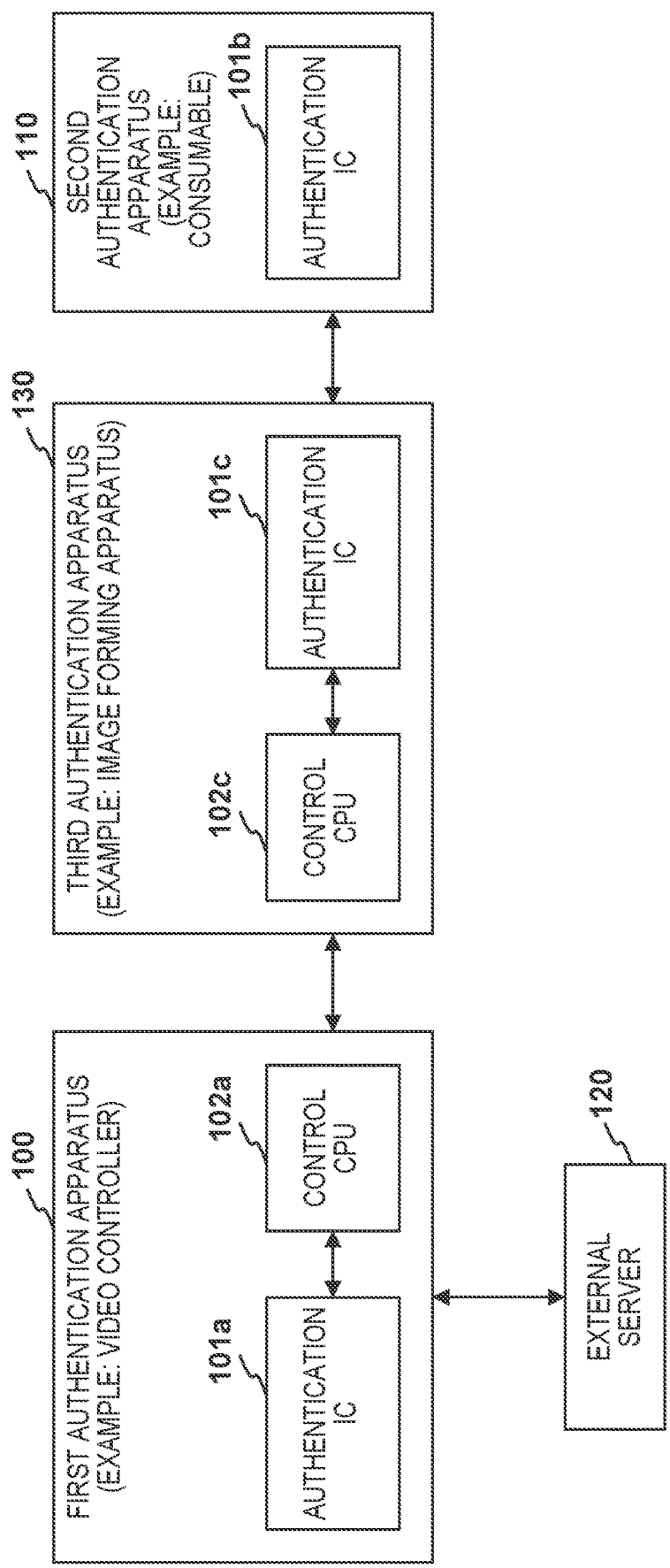
FIG. 10 is a diagram illustrating a mutual authentication system.

As illustrated in FIG. 10, the mutual authentication system may include three or more authentication apparatuses. The first authentication apparatus 100 (example: a video controller) has the control CPU 102a and the authentication IC 101a as described above. The second authentication apparatus 110 has the authentication IC 101b. A third authentication apparatus 130 (example: an image forming apparatus) includes a control CPU 102c for controlling an electric device such as an image forming apparatus and an authentication IC 101c. As illustrated in FIG. 2, the authentication IC 101c includes the nonvolatile memory 202, the arithmetic circuit 201, and the communication circuit 203. The second authentication apparatus 110 (example: a consumable) has the authentication IC 101b. The nonvolatile memory 202 of the authentication IC 101b stores the identification information of the second authentication apparatus 110 and the operation mode corresponding to the content of the contract. As described above, the special mode is selected as the operation mode or the normal mode is selected as the operation mode, in accordance with the result of forming the authentication pair (pair modification result) executed by the first authentication apparatus 100 and the second authentication apparatus 110.

In FIG. 10, the third authentication apparatus 130 is connected between the first authentication apparatus 100 and the second authentication apparatus 110, but the main role of the third authentication apparatus 130 is to relay communications between the first authentication apparatus 100 and the second authentication apparatus 110. That is, the third authentication apparatus 130 functions as a relay apparatus. Accordingly, the specific contents of the mutual authentication process and the mutual authentication pair modification processing in the third embodiment are as described in the first and second embodiments.

Figure 11:
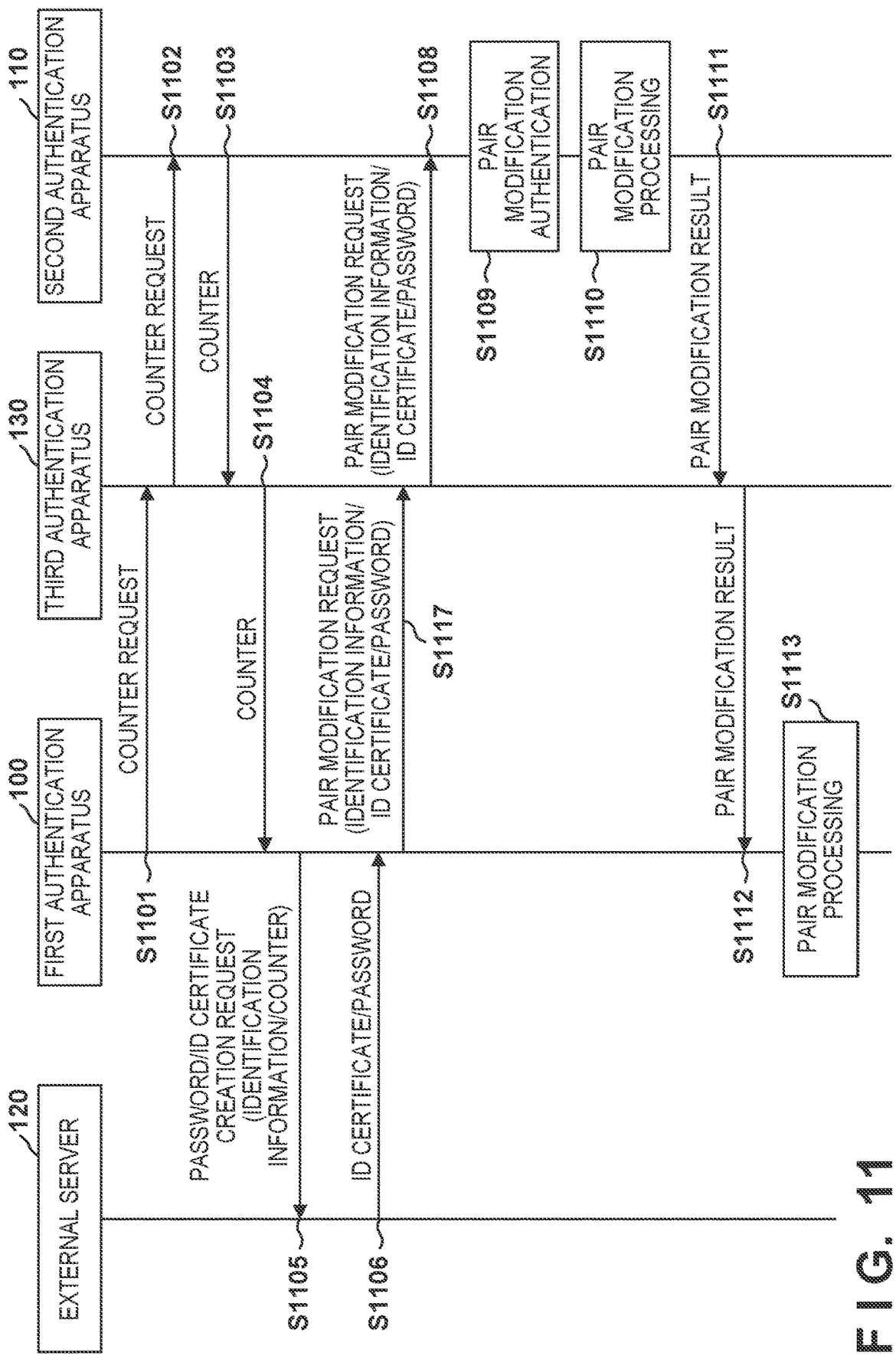
FIG. 11 is a sequence diagram for describing mutual authentication pair formation and modification.

FIG. 11 illustrates the mutual authentication pair modification processing in the third embodiment. The authentication IC 101c of the third authentication apparatus 130 recognizes that the first authentication apparatus 100 and the second authentication apparatus 110 are connected through the communication circuit 203, and sets the communication circuit 203 to function as a relay apparatus. The authentication IC 101c notifies the authentication IC 101a of the first authentication apparatus 100 that the second authentication apparatus 110 is connected to the third authentication apparatus 130. As a result, the authentication IC 101a of the first authentication apparatus 100 recognizes that it can communicate with the authentication IC 101b of the second authentication apparatus 110 via the third authentication apparatus 130.

In step S1101, the authentication IC 101a of the first authentication apparatus 100 transmits a counter request to the third authentication apparatus 130. The authentication IC 101c of the third authentication apparatus 130 receives the counter request from the first authentication apparatus 100. In step S1102, the authentication IC 101c of the third authentication apparatus 130 transmits (transfers) a counter request to the second authentication apparatus 110. The authentication IC 101b of the second authentication apparatus 110 receives the counter request.

In step S1103, the authentication IC 101b of the second authentication apparatus 110 reads the counter from the nonvolatile memory 202 and transmits it to the third authentication apparatus 130. The authentication IC 101c of the third authentication apparatus 130 receives the counter from the second authentication apparatus 110. In step S1104, the authentication IC 101c of the third authentication apparatus 130 transmits (transfers) the counter to the first authentication apparatus 100. The authentication IC 101a of the first authentication apparatus 100 receives the counter.

In step S1105, the authentication IC 101a of the first authentication apparatus 100 transmits a creation request including the identification information of the first authentication apparatus 100 and the counter of the second authentication apparatus 110 to the external server 120. In step S1106, the external server 120 creates a password and ID certificate in accordance with the creation request and transmits them to the first authentication apparatus 100.

In step S1107, the authentication IC 101a of the first authentication apparatus 100 transmits a pair modification request including a password, an ID certificate, and identification information of the first authentication apparatus 100 to the third authentication apparatus 130. In step S1108, the authentication IC 101c of the third authentication apparatus 130 transfers the pair modification request to the second authentication apparatus 110.

In step S1109, the authentication IC 101b of the second authentication apparatus 110 executes the pair modification authentication in accordance with the pair modification request. If pair modification authentication is successful, the authentication IC 101b proceeds to step S1110. In step S1110, the authentication IC 101b performs the pair modification process.

In step S1111, the authentication IC 101b transmits the pair modification result (including the identification information of the second authentication apparatus 110) to the third authentication apparatus 130. In step S1112, the authentication IC 101c of the third authentication apparatus 130 transfers the pair modification result to the first authentication apparatus 100. In step S1113, the authentication IC 101a of the first authentication apparatus 100 executes pair modification processing.

In FIG. 11, the pair modification processing according to the first embodiment is adopted, but the pair modification processing according to the second embodiment may be adopted. Even in such a case, the authentication IC 101c of the third authentication apparatus 130 functions as a relay apparatus.

As illustrated in the third embodiment, the mutual authentication pair can be formed and modified even between the first authentication apparatus 100 and the second authentication apparatus 110 which are not directly connected.

Fourth Embodiment

Image Forming Apparatus

Figure 12:
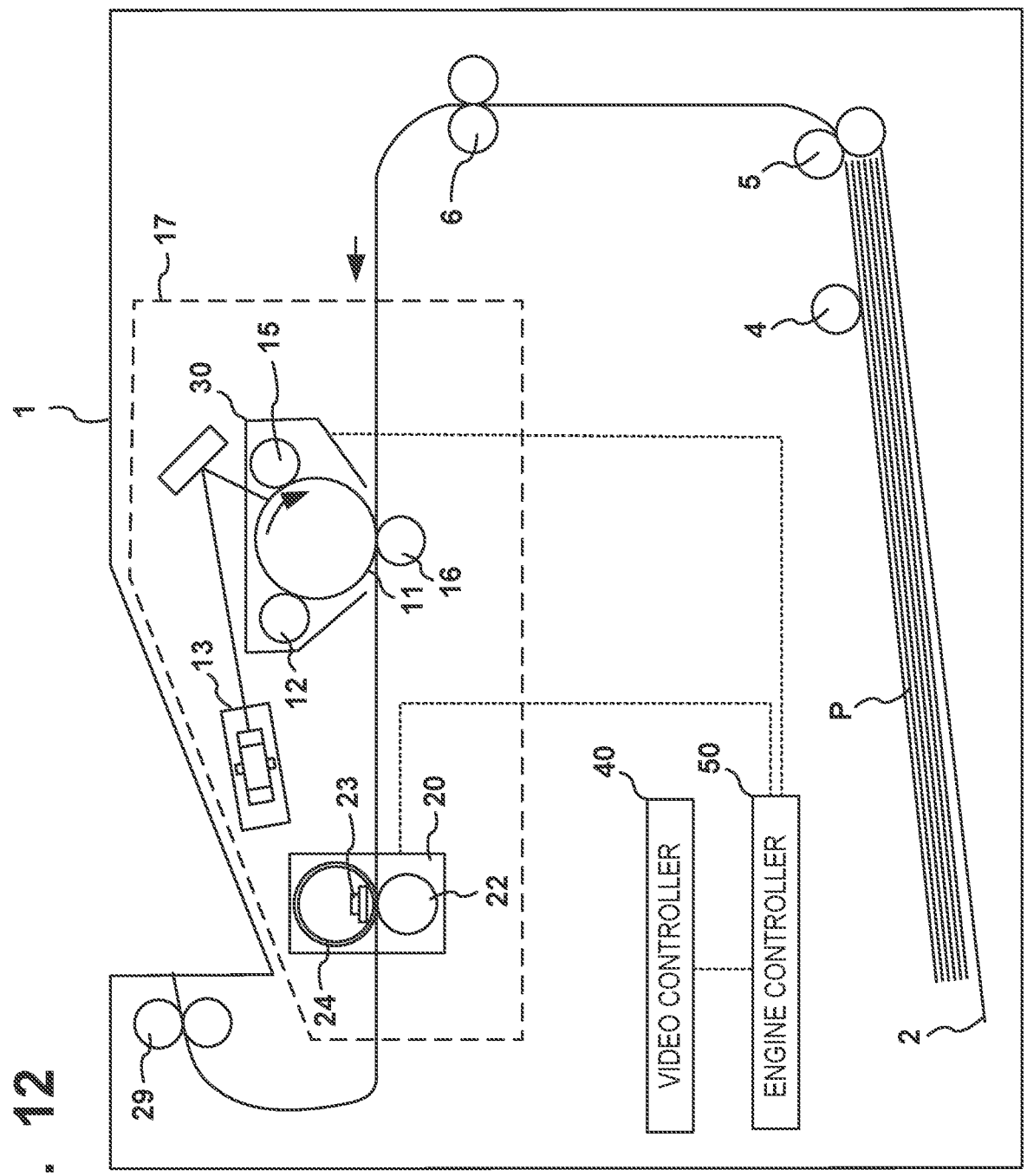
FIG. 12 is a view for describing an example of an authentication apparatus.

FIG. 12 illustrates an electrophotographic image forming apparatus 1. A sheet cassette 2 is a storage unit for storing the recording material P. A sheet feeding roller 4 is a supply unit that feeds a recording material P to the conveying path and supplies it to an image forming unit 17. A conveyance roller pair 5 and a registration roller pair 6 for conveying the recording material P are provided in the conveying path. The image forming unit 17 is provided with a photosensitive drum 11 that carries an electrostatic latent image or a toner image. A charging roller 12 uniformly charges the surface of the photosensitive drum 11. An exposure unit 13 modulates the laser beam with an image signal corresponding to the input image, and deflects the laser beam. Thus, the laser beam scans the surface of the photosensitive drum 11 and an electrostatic latent image is formed. A developing roller 15 develops an electrostatic latent image using toner to form a toner image. A transfer roller 16 transfers the toner image conveyed by the photosensitive drum 11 onto the recording material P. Here, the photosensitive drum 11, the charging roller 12, and the developing roller 15 form a process cartridge 30. The process cartridge 30 is a replaceable consumable.

A fixing device 20 applies heat and pressure to the toner image transferred to the recording material P while transporting the recording material P to fix the toner image to the recording material P. A pressure roller 22 is biased so as to be in contact with a fixing film 24. A heater 23 is in contact with the inner peripheral surface of the cylindrical fixing film 24, and heats the fixing temperature of the fixing film 24 to the target temperature. A discharge roller 29 discharges the recording material P on which the toner image is fixed by the fixing device 20. The fixing device 20 is also a replaceable consumable.

A video controller 40 is a controller that controls image formation of the image forming apparatus 1 and mainly generates image signals. An engine controller 50 mainly controls the image forming unit 17.

As described in the first and second embodiments, the video controller 40 has the authentication IC 101a and the control CPU 102a and may function as the first authentication apparatus 100. The engine controller 50 has the authentication IC 101b and the control CPU 102b and may function as the second authentication apparatus 110. In this case, the video controller 40 and the image forming apparatus 1 (the engine controller 50) form a mutual authentication pair.

As described in the third embodiment, the engine controller 50 has the authentication IC 101c and the control CPU 102c and may function as the third authentication apparatus 130. In this instance, the process cartridge 30 and the fixing device 20 may have the authentication IC 101b and function as the second authentication apparatus 110. In this case, the video controller 40 and the process cartridge 30 or the fixing device 20 form a mutual authentication pair. Incidentally, the engine controller 50 functions as a relay apparatus.

As described above, an option apparatus such as a large-volume feeding apparatus or a feeding apparatus for feeding elongated paper may be connected to the image forming apparatus 1. In this case, the option apparatus functions as the second authentication apparatus 110. In addition, a post-processing apparatus for performing post-processing (examples: punching, stapling, bookbinding) on a sheet on which an image is formed may be connected to the image forming apparatus 1. In this case, the post-processing apparatus functions as the second authentication apparatus 110.

<Technical Ideas Derived from the First to Third Embodiments>

[Aspect 1]

According to the first to third embodiments, a method of forming a mutual authentication pair by the first authentication apparatus 100 and the second authentication apparatus 110 is provided. The first authentication apparatus 100 obtains a modification restriction parameter (example: a counter count value) which is stored in the second authentication apparatus 110 and which indicates the number of times a mutual authentication pair modification is possible or the number of times modification has been executed. The first authentication apparatus 100 transmits authentication information (example: a password) corresponding to the modification restriction parameter to the second authentication apparatus 110. The second authentication apparatus 110 receives the authentication information from the first authentication apparatus 100, and determines whether or not the received authentication information is authentication information permitting a mutual authentication pair modification. When the received authentication information is authentication information that permits the mutual authentication pair modification, the second authentication apparatus 110 and the first authentication apparatus 100 form a mutual authentication pair. Thus, if the authentication information corresponding to the modification restriction parameter is successfully verified, the mutual authentication pair is formed or modified. If the authentication information corresponding to the modification restriction parameter verification fails, the mutual authentication pair formation or modification is rejected. Thus, an unauthorized modification to a mutual authentication pair is prevented, and a combination of a plurality of authentication apparatuses forming the mutual authentication pairs can be modified safely.

[Aspect 2]

When the received authentication information is authentication information that permits a mutual authentication pair modification, the second authentication apparatus 110 stores identification information (example: Cont1) of the first authentication apparatus 100 for mutually authenticating the first authentication apparatus 100. Similarly, the first authentication apparatus 100 stores the identification information (example: Eng1) of the second authentication apparatus 110 for mutually authenticating the second authentication apparatus 110. This ensures the information required for mutual authentication processing.

[Aspect 3]

The first authentication apparatus 100 may store the identification information of the first authentication apparatus 100 and the identification information of the other authentication apparatus forming the mutual authentication pair together with the first authentication apparatus 100. When the mutual authentication process is started, the first authentication apparatus 100 obtains the identification information of the second authentication apparatus 110 from the second authentication apparatus 110. The first authentication apparatus 100 determines whether the identification information of the second authentication apparatus 110 matches the identification information, stored in the first authentication apparatus 100, of the other authentication apparatus forming a mutual authentication pair together with the first authentication apparatus 100. There are cases where the identification information of the second authentication apparatus 110 does not match the identification information of the other authentication apparatus forming the mutual authentication pair. In this case, the first authentication apparatus 100 may obtain the modification restriction parameter from the second authentication apparatus 110 in order to start the formation of a new mutual authentication pair with the second authentication apparatus 110. This occurs, for example, when the old first authentication apparatus 100 fails and the new first authentication apparatus 100 is connected to the second authentication apparatus 110. In this embodiment, it is possible to replace only the failed authentication apparatus and continue to use an authentication apparatus that has not failed.

[Aspect 4]

As illustrated in case A, there are cases where the first authentication apparatus 100 has not yet formed a mutual authentication pair. In this case, the first authentication apparatus 100 may store, as the identification information of the other authentication apparatus, information (example: 0) indicating that the first authentication apparatus 100 has not yet formed a mutual authentication pair.

[Aspect 5]

As case D illustrates, the second authentication apparatus 110 may update a value of the modification restriction parameter upon completion of formation or modification of a mutual authentication pair. Thus, the second authentication apparatus 110 can appropriately manage the number of times a mutual authentication pair modification is possible.

[Aspect 6]

As illustrated in FIG. 5, the second authentication apparatus 110 may store state information (example: a lock state) indicating whether formation of the mutual authentication pair was completed or has not been completed. When the mutual authentication pair formation is completed, the second authentication apparatus 110 may update the state information from a state in which the mutual authentication pair formation has not been completed (example: No) to a state in which the mutual authentication pair formation has been completed (example: Yes).

[Aspect 7]

The second authentication apparatus 110 may store authentication information for each of different modification restriction parameters. The second authentication apparatus 110 may read the authentication information corresponding to the current modification restriction parameter among the plurality of authentication information stored in the second authentication apparatus 110. The second authentication apparatus 110 may determine whether or not the authentication information received from the first authentication apparatus 100 matches the authentication information corresponding to the current modification restriction parameter.

[Aspect 8]

The first authentication apparatus 100 may transmit a modification restriction parameter obtained from the second authentication apparatus 110 to a server (example: the external server 120). The first authentication apparatus 100 may receive authentication information (example: a password) corresponding to the modification restriction parameter from the server. The first authentication apparatus 100 may transmit the authentication information received from the server to the second authentication apparatus 110. In this way, the authentication information may be created by the server. Thus, since the first authentication apparatus 100 does not need to have a function of creating authentication information, the cost of the first authentication apparatus 100 may be reduced.

[Aspect 9]

The first authentication apparatus 100 may transmit identification information of the first authentication apparatus 100 to a server. Authentication information received from the server may include a certificate corresponding to identification information of the first authentication apparatus 100 (example: an ID certificate) and a password for permitting the mutual authentication pair modification. The second authentication apparatus 110 may verify the certificate included in the authentication information transmitted by the first authentication apparatus 100. When the second authentication apparatus 110 successfully verifies the certificate, it may verify the password included in the authentication information transmitted by the first authentication apparatus 100 and the password included in the authentication information stored in the first authentication apparatus 100. The second authentication apparatus 110 may terminate the process of forming a mutual authentication pair if the certificate verification fails. The password may be verified first. In this case, if the password verification is successful, certificate verification is performed.

[Aspect 10]

The second authentication apparatus 110 may receive instruction information (example: a switching certificate) instructing the operation mode of the second authentication apparatus 110 from the first authentication apparatus 100. The second authentication apparatus 110 may switch the operation mode of the second authentication apparatus 110 according to the received instruction information. This will allow the function implemented by the mutual authentication pair to be switched safely.

[Aspect 11]

The instruction information may include an instruction certificate (example: a switching certificate) associated with a particular operating mode of a plurality of operating modes in the second authentication apparatus 110. Configuration may be such that when verification of the instruction certificate included in the instruction information succeeds, the second authentication apparatus 110 switches the operation mode of the second authentication apparatus 110 to the operation mode corresponding to the instruction certificate. Configuration may be such that when verification of the instruction certificate included in the instruction information fails, the second authentication apparatus 110 does not switch the operation mode of the second authentication apparatus 110. This will allow the function implemented by the mutual authentication pair to be switched safely.

[Aspects 12 and 13]

The first authentication apparatus 100 may be a controller (example: a video controller). The second authentication apparatus 110 may have a built-in controller. Alternatively, the second authentication apparatus 110 may be the image forming apparatus 1 controlled by the first authentication apparatus 100. Alternatively, the first authentication apparatus 100 may be a controller of the image forming apparatus. The second authentication apparatus 110 may be a consumable or an option apparatus attached to the image forming apparatus.

[Aspect 14]

The first authentication apparatus 100 and the second authentication apparatus 110 may be connected via a relay apparatus (example: the third authentication apparatus 130)

that relays communications between the first authentication apparatus 100 and the second authentication apparatus 110. In this manner, the first authentication apparatus 100 and the second authentication apparatus 110 may be directly connected or may be indirectly connected. In addition, the first authentication apparatus 100 and the second authentication apparatus 110 may be wirelessly connected to each other.

[Aspect 15]

The relay apparatus may be an image forming apparatus (example: the engine controller 50). The first authentication apparatus 100 may be a controller (example: the video controller 40) for controlling an image forming apparatus. The second authentication apparatus 110 may be a consumable or an option apparatus attached to the image forming apparatus.

[Aspect 16]

Different functions (example: operation modes) may be implemented according to the combination of the first authentication apparatus 100 and the second authentication apparatus 110.

[Aspect 17]

The nonvolatile memory 202 is an example of a storage unit that is provided in the second authentication apparatus 110 and stores a modification restriction parameter indicating a number of times a mutual authentication pair modification is possible or a number of times modification has been executed.

The obtainment unit 302 is an example of an obtaining unit which is provided in the first authentication apparatus 100 and obtains a modification restriction parameter which is stored in the storage unit of the second authentication apparatus 110 and which indicates the number of times of a mutual authentication pair modification is possible or the number of times of modification has been executed. The communication circuit 203 is an example of a transmission unit that is provided in the first authentication apparatus 100 and that transmits to the second authentication apparatus 110 authentication information corresponding to the modification restriction parameter obtained from the second authentication apparatus 110. The communication circuit 203 may be provided in the second authentication apparatus 110 and function as a reception unit that receives authentication information from the first authentication apparatus 100. The authentication unit 305 and the password verification unit 308 are provided in the second authentication apparatus 110 and function as a determination unit that determines whether or not the authentication information received from the first authentication apparatus 100 is authentication information that permits a mutual authentication pair modification. The identification information management unit 304 is provided in the second authentication apparatus 110 and functions as a forming unit that forms a mutual authentication pair between the second authentication apparatus 110 and the first authentication apparatus 100 when the authentication information received from the first authentication apparatus 100 is authentication information that permits a mutual authentication pair modification.

[Aspect 18]

The first authentication apparatus 100 is an example of authentication apparatus that forms a mutual authentication pair with a counterpart authentication apparatus (example: the second authentication apparatus 110). The obtainment unit 302 functions as an obtaining unit that obtains a modification restriction parameter which is stored in a storage unit provided in the counterpart authentication apparatus and which indicates the number of times a mutual authentication pair modification is possible or the number of times a modification has been executed. The communication circuit 203 functions as a transmission unit that transmits to the counterpart authentication apparatus authentication information corresponding to a modification restriction parameter obtained from the counterpart authentication apparatus. The communication circuit 203 functions as a reception unit that receives from the counterpart authentication apparatus a result of determining whether or not the authentication information received from the authentication apparatus is authentication information permitting a mutual authentication pair modification. The authentication unit 305 and the identification information management unit 304 function as a forming unit that forms a mutual authentication pair with a counterpart authentication apparatus when the determination result indicates that the authentication information received from an authentication apparatus is authentication information permitting a mutual authentication pair modification.

[Aspect 19]

The second authentication apparatus 110 functions as an authentication apparatus which forms a mutual authentication pair with a counterpart authentication apparatus (example: the first authentication apparatus 100). The nonvolatile memory 202 functions as a storage unit which stores a modification restriction parameter indicating a number of times a mutual authentication pair modification is possible or a number of times modification has been executed. The counter management unit 307 functions as a unit that provides to the counterpart authentication apparatus a modification restriction parameter which is stored in a storage unit of the authentication apparatus and which indicates the number of times a mutual authentication pair modification is possible or the number of times modification has been executed. The communication circuit 203 functions as a reception unit that receives, from the counterpart authentication apparatus, authentication information corresponding to a modification restriction parameter. The authentication unit 305 and the password verification unit 308 function as a determination unit for determining whether or not the authentication information received from the counterpart authentication apparatus is authentication information permitting a mutual authentication pair modification. The authentication unit 305 and the identification information management unit 304 function as a forming unit that forms a mutual authentication pair with the counterpart authentication apparatus when the authentication information received from the counterpart authentication apparatus is authentication information that permits a mutual authentication pair modification.

The first authentication apparatus 100 and the second authentication apparatus 110 described above may be realized by the authentication IC 101. That is, the first authentication apparatus 100 and the second authentication apparatus 110 may be understood as an electric device including the authentication IC 101, or may be understood as the authentication IC 101 itself.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-004672, filed Jan. 15, 2020 which is hereby incorporated by reference herein in its entirety.

What is claimed is:

1. A mutual authentication system comprising a first authentication apparatus and a second authentication apparatus and operable to form a mutual authentication pair between the first authentication apparatus and the second authentication apparatus, wherein
the first authentication apparatus comprises:
a first processor; and
a first communication circuit connected to the first processor, and
the first processor is configured to obtain a modification restriction parameter which is stored in the second authentication apparatus and which indicates a number of times a mutual authentication pair modification is possible or a number of times modification has been executed, and
the first communication circuit is configured to transmit to the second authentication apparatus authentication information corresponding to the modification restriction parameter, and
the second authentication apparatus comprises:
a second processor; and
a second communication circuit connected to the second processor, and
the second communication circuit is configured to receive the authentication information from the first authentication apparatus, and
the second processor is configured to determine whether or not the received authentication information is authentication information for permitting the mutual authentication pair modification, and
in a case where the received authentication information is authentication information that permits the mutual authentication pair modification, the second authentication apparatus and the first authentication apparatus form a mutual authentication pair.

2. The mutual authentication system according to claim 1, wherein
the second authentication apparatus comprises a second memory configured to, in a caser where the received authentication information is authentication information that permits the mutual authentication pair modification, store identification information of the first authentication apparatus for mutually authenticating the first authentication apparatus, and
the first authentication apparatus comprises a first memory configured to, in a case where the received authentication information is authentication information that permits the mutual authentication pair modification, store identification information of the second authentication apparatus for mutually authenticating the second authentication apparatus.

3. The mutual authentication system according to claim 2, wherein
the first memory of the first authentication apparatus is configured to store identification information of the first authentication apparatus and identification information of another authentication apparatus forming a mutual authentication pair together with the first authentication apparatus,
the first processor of the first authentication apparatus is configured to
obtain identification information of the second authentication apparatus from the second authentication apparatus,
determine whether or not the identification information of the second authentication apparatus and identification information, stored in the first memory, of the other authentication apparatus forming the mutual authentication pair together with the first authentication apparatus match, and
in a case where the identification information of the second authentication apparatus and the identification information of the other authentication apparatus forming the mutual authentication pair do not match, obtain the modification restriction parameter from the second authentication apparatus in order to start formation a new mutual authentication pair with the second authentication apparatus.

4. The mutual authentication system according to claim 2, wherein
the second memory of the second authentication apparatus
is configured to store state information indicating a state in which formation of the mutual authentication pair is completed or a state in which the formation of the mutual authentication pair has not completed,
the second processor
is configured to, when the formation of the mutual authentication pair completes, update the state information from the state in which formation of the mutual authentication pair is completed to the state in which the formation of the mutual authentication pair has not completed.

5. The mutual authentication system according to claim 3, wherein
the first memory of the first authentication apparatus is configured to, in a case where the first authentication apparatus still has not formed a mutual authentication pair, store information indicating that the first authentication apparatus still has not formed a mutual authentication pair, as the identification information of the other authentication apparatus.

6. The mutual authentication system according to claim 1, wherein
the second processor of the second authentication apparatus is configured to, when formation or modification of the mutual authentication pair completes, update a value of the modification restriction parameter.

7. The mutual authentication system according to claim 1, wherein
the second memory of the second authentication apparatus is configured to store authentication information for each different modification restriction parameter,
the second processor is configured to determine whether or not the received authentication information is authentication information for permitting the mutual authentication pair modification, and
the second authentication apparatus is configured to read the authentication information corresponding to a current modification restriction parameter among the plurality of authentication information stored in the second authentication apparatus, and
to determine whether or not the authentication information received from the first authentication apparatus matches the authentication information corresponding to the current modification restriction parameter.

8. The mutual authentication system according to claim 1, wherein
the first communication circuit of the first authentication apparatus is configured to
transmit to a server a modification restriction parameter obtained from the second authentication apparatus, and
receive, from the server, authentication information corresponding to the modification restriction parameter, and
transmit to the second authentication apparatus the authentication information received from the server.

9. The mutual authentication system according to claim 8, wherein
the first communication circuit of the first authentication apparatus is configured to transmit, to the server, identification information of the first authentication apparatus,
the authentication information received from the server includes a certificate corresponding to identification information of the first authentication apparatus and a password for permitting the mutual authentication pair modification,
the second processor of the second authentication apparatus is configured to, in a case where the certificate included in the authentication information transmitted from the first authentication apparatus is verified, and the verification of the certificate succeeds, verify a password included in the authentication information transmitted from the first authentication apparatus and a password included in authentication information stored in the first authentication apparatus, and in a case where the verification of the certificate fails, end a mutual authentication pair formation process.

10. The mutual authentication system according to claim 1, wherein
the second communication circuit of the second authentication apparatus is configured to
receive instruction information for instructing an operation mode of the second authentication apparatus from the first authentication apparatus,
the second processor is configured to switch an operation mode of the second authentication apparatus in accordance with the received instruction information.

11. The mutual authentication system according to claim 10, wherein
the instruction information includes an instruction certificate associated with a particular operating mode among a plurality of operating modes in the second authentication apparatus,
the second processor of the second authentication apparatus is configured to, in a case where verification of the instruction certificate included in the instruction information succeeds, switches to the operation mode of the second authentication apparatus to an operation mode corresponding to the instruction certificate, and in a case where verification of the instruction certificate included in the instruction information fails, does not switch the operation mode of the second authentication apparatus.

12. The mutual authentication system according to claim 1, wherein
the first authentication apparatus is a controller, and
the second authentication apparatus is built into the controller or is an image forming apparatus controlled by the first authentication apparatus.

13. The mutual authentication system according to claim 1, wherein
the first authentication apparatus is an image forming apparatus, and
the second authentication apparatus is a consumable or an option apparatus to be attached to the image forming apparatus.

14. The mutual authentication system according to claim 1, wherein
via a relay apparatus that relays communication between the first authentication apparatus and the second authentication apparatus, the first authentication apparatus and the second authentication apparatus are connected.

15. The mutual authentication system according to claim 14, wherein
the relay apparatus is an image forming apparatus, and
the first authentication apparatus is a controller configured to control the image forming apparatus, and
the second authentication apparatus is a consumable or an option apparatus to be attached to the image forming apparatus.

16. The mutual authentication system according to claim 1, wherein
different functions are realized in accordance with a combination of the first authentication apparatus and the second authentication apparatus.

17. A mutual authentication system operable to form a mutual authentication pair between a first authentication apparatus and a second authentication apparatus, the mutual authentication system comprising:
a storage unit provided in the second authentication apparatus and configured to store a modification restriction parameter indicating a number of times a mutual authentication pair modification is possible or a number of times modification has been executed;
an obtaining unit provided in the first authentication apparatus and configured to obtain the modification restriction parameter which is stored in the storage unit of the second authentication apparatus and which indicates the number of times the mutual authentication pair modification is possible or the number of times of modification has been executed, a transmission unit provided in the first authentication apparatus and configured to transmit to the second authentication apparatus authentication information corresponding to the modification restriction parameter obtained from the second authentication apparatus;

a reception unit provided in the second authentication apparatus and configured to receive the authentication information from the first authentication apparatus;

a determination unit provided in the second authentication apparatus and configured to determine whether or not the authentication information received from the first authentication apparatus is authentication information permitting the mutual authentication pair modification; and a forming unit provided in the second authentication apparatus and configured to, in a case where the authentication information received from the first authentication apparatus is authentication information permitting the mutual authentication pair modification, form the mutual authentication pair between the second authentication apparatus and the first authentication apparatus.

18. An authentication apparatus operable to form a mutual authentication pair with a counterpart authentication apparatus, the authentication apparatus comprising:

an obtaining unit configured to obtain a modification restriction parameter which is stored in a storage unit provided in the counterpart authentication apparatus and which indicates a number of times mutual authentication pair modification is possible or the number of times modification has been executed;

a transmission unit configured to transmit to the counterpart authentication apparatus authentication information corresponding to the modification restriction parameter obtained from the counterpart authentication apparatus;

a reception unit configured to receive a determination result as to whether or not the authentication information received from the authentication apparatus is authentication information permitting the mutual authentication pair modification; and a forming unit configured to, in a case where the determination result indicates that the authentication information received from the authentication apparatus is authentication information permitting the mutual authentication pair modification, form the mutual authentication pair with the counterpart authentication apparatus.

* * * * *